Feb. 5, 1952 B. E. PHELPS 2,584,811

ELECTRONIC COUNTING CIRCUIT

Original Filed Dec. 27, 1944

INVENTOR.
B. E. PHELPS

BY W. M. Wilson

Patented Feb. 5, 1952

2,584,811

UNITED STATES PATENT OFFICE 2,584,811

ELECTRONIC COUNTING CIRCUIT

Byron E. Phelps, Chatham, N. J., assignor to International Business Machines Corporation, New York, N. Y., a corporation of New York Original application December 27, 1944, Serial No. 569,992. Divided and this application March 13, 1946, Serial No. 654,175

37 Claims. (Cl. 250—27)

This application is a division of the copending application of Ralph L. Palmer and Byron E. Phelps, Serial No. 569,992, filed December 27, 1944 now patent No. 2,536,955.

This invention relates to an electronic counting circuit, that is, an electrical network including electronic tubes and so constituted as to undergo various predetermined changes in state, in response to the entry of values, the different states of the network representing different values. The counting circuit is of the type comprising a chain of trigger circuits, each trigger circuit having two stable conditions which it assumes alternately on receiving a voltage impulse of the right characteristics. Different values are represented by different combinations of the two stable conditions of the trigger circuits. Such a counter is inherently binary.

Accordingly, one of the objects of the invention is to adapt this type of counter to the decimal system.

Another object is to provide an improved triode trigger circuit.

Another object is to provide an electronic counter embodying improved trigger circuits capable of discriminating between positive and negative pulses.

Other objects of the invention will be pointed out in the following description and claims and illustrated in the accompanying drawings, which disclose, by way of example, the principle of the invention and the best mode, which has been contemplated, of applying that principle.

Figures 1, 2, 3:
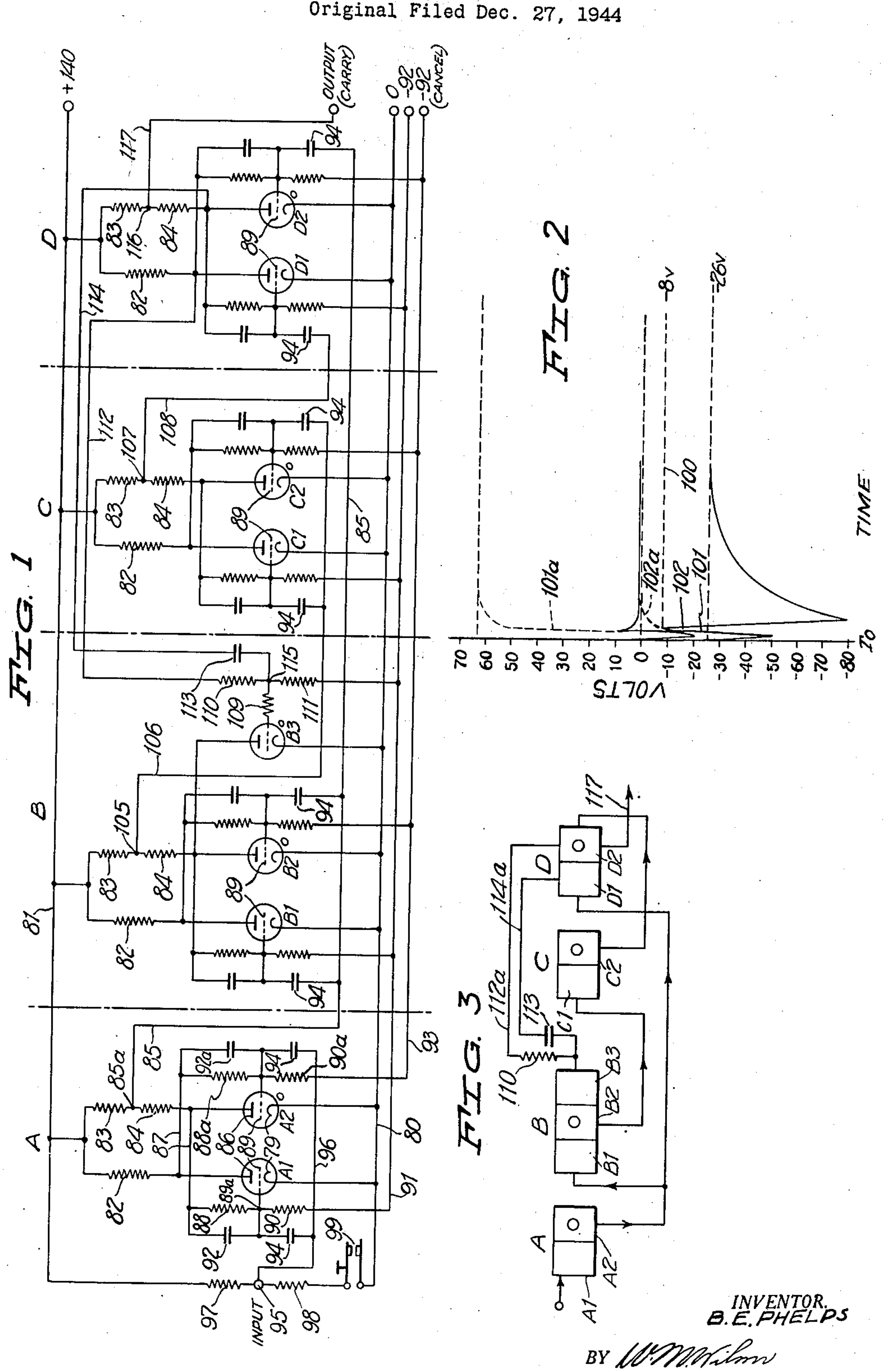
Fig. 1 is a circuit diagram of the electronic counter.
Fig. 2 is a diagram of the voltage conditions in a single trigger circuit on switching from one condition to another.
Fig. 3 is a block diagram of a modified form of the electronic counter.

The electronic counter circuit shown in Fig. 1 comprises a series of interconnected trigger circuits A, B, C and D separated by dot-and-dash lines. The principle of operation of counter circuits of this class is well known (see, for instance, a paper by Lifschutz & Lawson in Review of Scientific Instruments for March 1938, page 3). Input impulses to be counted are impressed upon the first stage of the counter. On each second impulse received, the first stage passes an impulse to the second stage. The latter passes an impulse to the third stage on each alternate impulse received from the first stage, and so on through the series. The frequency of the input impulses is thus divided according to the function $$\frac{1}{2}n$$

where $n$=the number of stages. The third stage will pass an impulse to the fourth stage when the eighth impulse is received by the first stage, and the fourth stage will pass an impulse at the sixteenth impulse to be counted.

This system, in its known forms, is not directly suited for the decimal system and has been modified, in accordance with the present invention to cause the counter to count eight impulses and two additional impulses before passing an output impulse. The two additional impulses may be counted before the eight impulses are counted, for example, or after the eight impulses are counted. Two means for accomplishing this result will be described presently, by way of illustration.

*Trigger Circuit.*—The individual trigger circuits operate according to a novel principle, which will be explained by reference to stage A in Fig. 1. Values of applied voltages, resistances, and capacitances are stated in the specification, in order to clarify the illustration, but they may be varied considerably without departing from the principles to be explained. The values given limit the speed of operation of the counter to 16,000—20,000 impulses per second, but the speed can be increased by suitable alteration of the circuit components.

The trigger circuit comprises two electronic tube elements, which may conveniently be the two halves of a twin tube, such as a 12SN7, or they may be two 6J5's. Some features of the invention are particularly concerned with triodes, which have for this reason been shown in the drawing, but other features of the invention are not limited to triodes. In this specification each element comprising a plate, cathode, and one or more grids is called a tube. The cathodes 79 are connected to a zero potential line 80, while the plates are connected to a +140 volt line 81, through equal resistances 82 and 83 plus 84. The resistance 82 is shown as a single resistance of .02 megohms while the resistances 83 and 84 are of .005 and .015 megohms, respectively, an output lead 85 being connected to an output terminal 85*a* between the latter two resistances. The plate 86 of tube A2 is connected by a lead 87 to one end of a voltage divider composed of two resistances 88 and 90, each of .2 megohms, the other end of the voltage divider being connected to a −92 volt bias line 91. The grid 89 of tube A1 is connected to the mid-point 89a of the voltage divider 88, 90. A condenser 92 of .001 microfarads is connected in parallel to the resistance 88. The plate 96 of tube A1 is connected in the same way by a lead 87 to one end of a voltage divider 88a, 90a, the other end of which is connected to another −92 volt bias line 93, to be referred to as the "cancel" bias line. The grid 89 of tube A2 is connected to the mid-point of the voltage divider 88a, 90a. A condenser 92a of .001 microfarads is connected in parallel to resistance 88a. The grids of both tubes are further coupled by individual condensers 94 of .0005 microfarads, and a wire 96, to an input terminal 95; that is, the input terminal is connected to the front plates of the condensers 94 and the grids 89 are connected to the rear plates. The +140 volt line 81 is connected through a resistance 97 of .005 megohms to the input terminal 95. A resistance 98 of .027 megohms and a switch 99 are shown for connecting the input terminal 95 to the 0 volt line 80, but these are merely representative of any suitable impulsing or entry means.

The trigger circuit has two stable conditions, in one of which the tube A1 is conductive, while in the other the tube A2 is conductive. When either tube is conductive, the other is biased below cutoff. An impulse having the right characteristics applied to the input terminal 95 will cause the circuit to reverse from either stable condition to the other. The small circle near the tube A2 indicates that this tube is conductive in the normal or 0 state of the counter. When the trigger circuit reverses to the right, that is, the right hand tube A2 becomes conductive, an effective impulse is transmitted to the next stage, as will be explained presently. For this reason the right hand tube of each stage is called the transmitting tube while the left hand one is called the counting tube. A single stage of the counter is said to be "off" when it is in normal condition, with the transmitting tube conducting, and "on" when reversed.

The voltage drop from plate to cathode of one of these tubes when it is conducting current in the circuit is about 40 volts, hence the potential at the plate of tube A2, in the normal condition of the trigger circuit, is +40 volts. The mid-point 89a of the voltage divider 88, 90 is therefore at −26 volts potential. Since the tube cuts off at a grid potential of −8 volts, this tube is non-conductive.

If the potential of the plate of the tube A1 and of the grid 89 of tube A2 were determined only by the voltage drops across the voltage divider 82, 88a, 90a, by Ohms law, the potential of this plate would be +129 volts, and the potential of the grid 89 of tube A2 would be +19 volts. However, when the tube A2 is conducting, due to a positive grid potential, grid current flows and reduces the potential of the grid to approximately zero volts, and this draws the potential of the plate down to about +127 volts. In this state the potential drop across the condenser 92 is 66 volts, while the condenser 92a is charged by a potential of 127 volts. The input terminal 95, with the switch 99 open, has a potential of +140 volts. If the switch is now closed, current will flow through the resistances 97 and 98 and the potential of the input terminal will drop by about 22 volts. This negative impulse applied through the condensers 94 to the grids of the tubes A1 and A2 will reduce the potential of the former to −48 volts and the potential of the latter to −22 volts.

Since both halves of the trigger circuit have the same time constant their condensers will reach 90% discharge at the same time, but because the tube A2 has been cut off its plate potential jumps to a high value and causes the potential of the grid of tube A1 to rise much more rapidly than that of the grid of the tube A2. Thus, although the former starts from a lower potential, it rises above the cut-off potential ahead of the latter and the tube A1 becomes conductive. The potential of the plate of this tube drops sharply, driving down the potential of the grid of the tube A2, so that it cannot rise to the cut-off potential.

Fig. 2 is a diagram sketched from curves of grid voltage indicated by an oscilloscope. The curve 101 represents the potential of the grid of the tube which is nonconductive when the negative impulse arrives; the curve 102 represents the potention of the grid of the other tube. The negative impulse at time T0 depresses both potentials equally (to about half the theoretical negative peak if the wave front were vertical), then the curve 101 rises sharply, reaching the cut off potential, −8 volts, ahead of the curve 102. When this occurs the curve 102 turns down, away from the line 102a along which it would otherwise have moved. After reaching a negative peak of about −80 volts the curve 102 rises toward its stable value of −26 volts. The curve 101 reaches a positive peak of about +7 volts, where it leaves the curve 101a, along which it would have traveled if its rise were not checked by grid current and subsides to about +.4 volts. The trigger circuit has reversed.

When the switch 99 is opened, the potential at terminal 95 will rise and a positive voltage impulse of about 22 volts will be transmitted through the condensers 94 of stage A to the grids of tubes A1 and A2. This tends to bring the potential on the grid of tube A2 from −26 to −4, but at the same time the potential on the plate of tube A1 drops, due to the rise in the grid potential of tube A1 and this drop of the plate potential of tube A1 holds the potential on the grid of tube A2 below the conducting point, −8 volts; in fact, actually drives said potential more negative. Therefore, only the negative impulse will reverse the trigger and the auxiliary means, such as a coupling tube, usually required to enable a triode trigger circuit to discriminate between positive and negative impulses, is dispensed with.

Each of the stages B, C and D contains all of the basic features of the trigger circuit A described above. The output terminal 85a of trigger A is coupled by the lead 85 and condensers 94 to the grids 89 of tubes B1 and B2, and also by an extension of said lead and a condenser 94 to the grid 89 of tube D2. An output terminal 105 in the voltage divider 83, 84 of stage B is coupled by a lead 106 and condensers 94 to the grids 89 of tubes C1 and C2. An output terminal 107 in the voltage divider 83, 84 of stage C is coupled by a lead 108 and condenser 94 to the grid 89 of tube D1.

Stage B has, in addition to the basic trigger circuit, a locking tube B3, the plate of which is connected directly to the plate of the tube B2. The grid of the tube B3 is connected through a resistor 109, of .5 megohms, to the mid-point of a voltage divider comprising resistances 110 and 111, each of .5 megohms. One terminal of this voltage divider is connected by a wire 112 to the plate of tube D1, while the other terminal is connected to the −92 volt lead 91. The mid-point of the voltage divider 110, 111 is also coupled through a small condenser 113 of .00015 microfarads, and a wire 114, to the plate of tube D2. The small circles at the right of the tubes A2, B2, B3, C2, and D2 indicate that these tubes are conductive in the normal, or zero, condition of the counter. The counter can be restored to this condition by disconnecting the cancel bias wire 93 from the −92 volt supply, by means to be described presently.

When, in the course of entering a number in the counter, the second impulse is applied to the input terminal 95 and transfers trigger A back to the right, the point 85*a* drops from a potential of +137 volts to a potential of +115 volts. The drop in potential thus applied to the lead 85 is transmitted through the condenser 94 of the tube B2 and depresses the potential of the grid of that tube below cut-off, but since the tube B3 is conducting, its plate is maintained at a potential of +40 volts and the grid of tube B1 is thereby prevented from rising above the cut-off potential, in accordance with curve 101 of Fig. 2. The same negative impulse imparted to the lead 85 is transmitted to the grid of tube D2 only, of trigger D and transfers the trigger D to the left. The potential of the plate of tube D1 and at the top of the voltage divider 110, 111 falls, but at the same time the potential on the plate of the tube D2 rises and this rise is transmitted through the wire 114 and condenser 113 to the mid-point 115 of the voltage divider 110, 111 and holds the grid of tube B3 above cut-off potential, until the second input impulse applied to the terminal 95 has ended.

The tube B3 is thereby maintained in a conductive state during this time and locks the trigger B against transferring, but as soon as the charge leaks off the condenser 113 the point 115 assumes a potential determined by the voltage divider 110, 111 and the tube B3 is cut off. The resistance 109 opposes grid current in the tube B3 and allows the point 115 to swing sufficiently positive to provide the necessary time delay to prevent the tube B3 from being cut off until the end of the second input impulse. The time delay terminates early enough to allow the tube B3 to become non-conductive before the fourth input impulse arrives. The fourth input impulse transfers trigger A back to the right and a negative pulse on line 85 finds the tube B2 free of the influence of the tube B3, so that the potential on its plate rises toward its maximum value as the negative impulse applied to its grid over line 85 and condenser 94 renders the tube non-conductive. Therefore, the fourth input impulse transfers stage B to the left. The sixth input pulse transfers stage B back to the right which causes a negative impulse to be transmitted from terminal 105 over line 106 to stage C, turning the latter to the left. The tenth input impulse transfers stage C back to the right which causes a negative impulse to be transmitted from terminal 107 through the lead 108 and condenser 94 to the tube D1 only, of trigger D, which transfers stage D back to the right. This causes a carry impulse to be transmitted from an output terminal 116, through lead 117 to any suitable utilization device, or, if the counter constitutes one of the lower orders of a register or accumulator, to the carry device which adds, one, to the next higher order. The counter circuit itself is restored to zero condition by the tenth input impulse and is ready to count further impulses. The complete sequence of conditions of the counter circuit is shown in the following table, in which "X" indicates the conductive state:

| | A1 | B1 | B3 | C1 | D1 |
|---|---|---|---|---|---|
| 0 | ------ | ------ | X | ------ | ------ |
| 1 | X | ------ | X | ------ | ------ |
| 2 | ------ | ------ | ------ | ------ | X |
| 3 | X | ------ | ------ | ------ | X |
| 4 | ------ | X | ------ | ------ | X |
| 5 | X | X | ------ | ------ | X |
| 6 | ------ | ------ | ------ | X | X |
| 7 | X | ------ | ------ | X | X |
| 8 | ------ | X | ------ | X | X |
| 9 | X | X | ------ | X | X |

The counter circuit just described and shown in Fig. 1 counts two impulses and then eight impulses. Fig. 3 illustrates how, by a simple modification of the circuit, the counter can be made to count eight impulses and then two impulses, the second one of the two impulses causing an output impulse from the counter. Fig. 3 is a block diagram representing a series of trigger circuits, which is assumed to be composed of the same elements, connected in the same way, as in Fig. 1, except for certain alterations in the interstage connections, to be referred to. This counter circuit comprises four stages A, B, C and D. The two tubes of each stage and related wires within each stage are represented by rectangles, A1, A2, B1, B2, etc., the stage B having a third rectangle, B3, representing a locking tube. The small circles show the normal or zero state of the counter; that is, they indicate that the right hand tube of each stage is normally conducting. The locking tube of stage B is normally non-conducting, since the right hand tube of stage D is normally conducting and, through wire 112*a*, the potential of the plate of this tube, which is depressed by the conductive state of the tube, acts through the resistance 110 to hold the grid of the locking tube B3 below the cut-off potential.

The first eight input impulses cause the counter circuit to pass through a normal series of changes, the eighth impulse causing a carry impulse to be transmitted from the output of the tube C2 to the grid of the tube D2, which reverses the trigger circuit D. The rise in potential of the plate of tube D2 is transmitted through wire 112*a*, tending to raise the potential of the grid of tube B3. A negative impulse transmitted from the plate of tube D1, which has now become conductive, through wire 114*a*, and condenser 113, temporarily holds down the potential of the grid of tube B3, until the condenser 113 is discharged. The tube B3 then becomes conductive and locks stage B in its right hand condition. The action is identical to that previously described in reference to Fig. 1.

When two more input impulses follow, the second impulse is transmitted from tube A2 to stage B and also to the tube D1. At this time the locking tube B3 is conductive and stage B cannot respond to the impulse; it remains in its normal state shown in Fig. 3. The impulse transmitted to tube D1, on the other hand, reverses stage D back to its normal state and causes an output impulse to be sent through the output wire 117. The entire counter circuit is then in its normal state, with all the trigger circuits transferred to the right and the locking tube B3 non-conducting. The complete sequence of conditions of the counter in Fig. 3 is shown in the following table:

| | A1 | B1 | B3 | C1 | D1 |
|---|---|---|---|---|---|
| 0 | | | | | |
| 1 | X | | | | |
| 2 | | X | | | |
| 3 | X | X | | | |
| 4 | | | | X | |
| 5 | X | | | X | |
| 6 | | X | | X | |
| 7 | X | X | | X | |
| 8 | | | X | | X |
| 9 | X | | X | | X |

The two circuits shown in Figs. 1 and 3 are illustrative of how a binary counter can be modified, in accordance with the invention, to count by the decimal system, which is the most useful modification. The principle can be applied, however, to counting in other systems. For example for duodecimal counting the locking tube can be annexed to stage C and the output impulses of stage B instead of stage A, sent to stage D, to reverse the latter in one direction. The principle of operation is characterized by the fact that a higher stage controls an intermediate stage to prevent response to certain impulses, thereby modifying the normal binary sequence. Also, the highest stage is made to execute its complete cycle in two steps, one of which is determined by the transmission of an operating impulse from the next lower stage, which turns the highest stage in one direction, while the other is determined by the transmission of an operating impulse from a stage further down in the series, which turns the highest stage in the other direction.

While there have been shown and described and pointed out the fundamental novel features of the invention as applied to a plurality of modifications it will be understood that various omissions and substitutions and changes in the form and details of the devices illustrated and in their operation may be made by those skilled in the art, without departing from the spirit of the invention. It is the intention, therefore, to be limited only as indicated by the scope of the following claims.

What is claimed is:

1. In an electronic counter, a series of trigger circuits each comprising two triodes, the anode of each triode being coupled by a capacitance and resistance in parallel to the grid of the opposite triode in the same trigger circuit, a voltage supply having high, intermediate, and low taps, means connecting the cathodes of said triodes to said intermediate tap, anode connections including resistances for connecting the anodes of said triodes to said high tap, means including resistances for connecting the grids of said triodes to said low tap, means providing a capacitative coupling between an output point on the anode connection of one triode of each trigger circuit and the grids of the triodes in the next higher trigger circuit of the series, except the highest, said highest having but one triode so connected, said output points being located so as to undergo a drop in voltage when the related tube becomes conductive, the drop being of sufficient magnitude to reverse the next higher trigger circuit of the series, the grids of the non-conducting triodes being biased sufficiently below cutoff so that positive impulses transmitted through said capacitative couplings do not reverse the trigger circuits, a locking tube having an anode and a cathode connected in parallel to the anode and cathode of one of the triodes of one of the lower trigger circuits of the series, and means coupling the grid of said locking tube to said highest trigger circuit of the series so that the conductivity of said locking tube is controlled by said highest trigger circuit.

2. In an electronic counter, a series of trigger circuits each comprising two triodes, the anode of each triode being coupled by a capacitance and resistance in parallel to the grid of the opposite triode in the same trigger circuit, a voltage supply having high, intermediate, and low taps, means connecting the cathodes of said triodes to said intermediate tap, anode connections including resistances for connecting the anodes of said triodes to said high tap, means including resistances for connecting the grids of said triodes to said low tap, means providing a capacitative coupling between an output point on the anode connection of one triode of each trigger circuit and the grids of the triodes in the next higher trigger circuit of the series, except the highest, said highest having but one triode so connected, said output points being located so as to undergo a drop in voltage when the related tube becomes conductive, the drop being of sufficient magnitude to reverse the next higher trigger circuit of the series, the grids of the non-conducting triodes being biased sufficiently below cutoff so that positive impulses transmitted through said capacitative couplings do not reverse the trigger circuits, means coupling the output point of a lower trigger circuit of the series to the grid of that one of the triodes of the highest trigger circuit of the series not connected to the output point of the immediately preceding trigger, a locking tube having an anode and a cathode connected in parallel to the anode and cathode of one of the triodes of an intermediate trigger circuit of the series, means including a resistance for connecting the grid of said locking tube to the anode of one of the triodes of said highest trigger circuit, and means including a capacitance for connecting the grid of said locking tube to the anode of the other triode of said highest trigger circuit.

3. In a counter, a group of stages, each stage comprising a trigger circuit having an on and an off condition and being adapted to be changed from one condition to the other in alternation, in response to successive electrical impulses; means interconnecting said stages in a series and including means whereby each stage, except the highest in the series, on changing from a chosen condition to the other condition transmits an operating impulse to the next stage in the series, means to apply operating impulses to the lowest stage of the series; and means controlled by said highest stage to lock a lower stage against response to an operating impulse.

4. In a counter, a group of stages, each stage comprising a trigger circuit having an on and an off condition and being adapted to be changed from one condition to the other in alternation, in response to successive electrical impulses; means interconnecting said stages in a series and including means whereby each stage, except the highest in the series, on changing from a chosen condition to the other condition transmits an operating impulse to the next stage in the series, said connections also including means to transmit an operating impulse from a lower stage directly to a higher stage, to trigger the latter in one direction, means to apply operating impulses to the lowest stage of the series; and means controlled by said higher stage to alter the sequential operation of a lower stage.

5. In a counter, a group of stages, each stage comprising a trigger circuit having an on and an off condition and being adapted to be changed from one condition to the other in alternation, in response to successive electrical impulses; means interconnecting said stages in a series for normal operation in the binary base notation and including means whereby each stage, except the highest in the series, on changing from a chosen condition to the other condition transmits an operating impulse to the next stage in the series, means to apply operating impulses to the lowest stage of the series; and means effective during each full cycle of operation of said counter and including the first such cycle to produce an output pulse once for a chosen number of counting input pulses said means comprising means interconnecting a plurality of said trigger circuits and rendered operative by said counter binary operation to automatically alter the straight binary operation of said counter, to operation in a different base notation.

6. In a counter, a group of stages each comprising a trigger circuit having two stable conditions between which it alternates in response to electrical impulses, means interconnecting said stages in a series for normal operation in the binary base notation and including means whereby each stage, except the highest in the series, on changing to one of its stable conditions transmits an operating impulse to the next higher stage in the series; means to apply operating impulses to the lowest stage in the series; and means controlled by a higher stage of the series for preventing the response of an intermediate stage of the series to certain impulses to thereby change the normal binary base notation to operation in another base notation.

7. In a counter, a group of stages each comprising a trigger circuit having two stable conditions between which it alternates in response to electrical impulses, means interconnecting said stages in a series for normal operation and including means whereby each stage, except the highest in the series, on changing to one of its stable conditions transmits an operating impulse to the next higher stage in the series; means to apply operating impulses to the lowest stage in the series; means controlled by a higher stage of the series for altering the normal operation of an intermediate stage of the series; and means for transmitting operating impulses to said higher stage from a stage lower in the series than said intermediate stage, said last means being effective to turn said higher stage to one of its stable conditions, but not to the other.

8. In a counter, a group of stages each comprising a trigger circuit having two stable conditions between which it alternates in response to electrical impulses, means interconnecting said stages in a series and including means whereby each stage, except the highest in the series, on changing to one of its stable conditions transmits an operating impulse to the next higher stage in the series; means to apply operating impulses to the lowest stage in the series; and means for transmitting an operating impulse from a lower stage in the series directly to the highest stage in the series, to turn the latter to one of its stable conditions.

9. In a counter, a group of four stages each comprising a trigger circuit including two discharge elements so interconnected that said elements are rendered conductive alternately, in response to the application of an electrical impulse to the trigger circuit; means interconnecting the stages to form a series and including means whereby one element of each stage, on becoming conductive, transmits an operating impulse to the next higher stage, said interconnecting means also including means to transmit operating impulses to one element of the highest stage simultaneously with impulses transmitted to the second stage; means to apply impulses to the lowest stage; locking means comprising an electronic discharge element connected in parallel to one of the elements of the second stage in the series; and means controlled by said highest stage, whereby said locking element is rendered alternately conductive and non-conductive, in dependence upon the alternating conductivity of the elements of said highest stage one of said conductive conditions of said locking means causing said means to alter the operation of said second stage.

10. In a counter, a series of trigger stages connected in cascade, each comprising a counting element having an anode, a cathode and a grid, a similar transmitting element, means cross-coupling the plates and grids of said counting and transmitting elements, and an impulsing capacitance connected to each of said grids, means for applying impulses to be counted to the lowest stage capacitance, locking means controlled by the highest stage for locking an intermediate stage of the series against response to an impulse transmitted thereto, said locking means being in locking condition when the transmitting element of the said highest stage is conducting and in releasing condition when the counting element of said highest stage is conducting, and means for transmitting impulses from the transmitting element of a stage below said intermediate stage to the impulsing capacitance pertaining to said highest stage.

11. In a counter, a series of trigger stages connected in cascade, each comprising a counting element having an anode, a cathode and a grid, a similar transmitting element, means cross-coupling the plates and grids of said counting and transmitting elements, and an impulsing capacitance connected to each of said grids, means for applying impulses to be counted to the lowest stage capacitance, the impulsing capacitance pertaining to the highest stage of the series being connected to the impulsing capacitance pertaining to a lower stage in the series, locking means for locking said lower stage against response to an impulse transmitted thereto, and means controlled by said highest stage, when the transmitting element thereof becomes non-conductive, for releasing said locking means.

12. In a counter, a series of trigger stages connected in cascade, each comprising a counting element having an anode, a cathode and a grid, a similar transmitting element, means cross-coupling the plates and grids of said counting and transmitting elements, and an impulsing capacitance connected to each of said grids, means for applying impulses to be counted to the lowest stage capacitance, the impulsing capacitance pertaining to the highest stage of the series being connected to the impulsing capacitance pertaining to a lower stage in the series, locking means for locking said lower stage against response to an impulse transmitted thereto, means controlled by said highest stage when the transmitting element thereof becomes non-conductive for releasing said locking means, and delaying means connected to the anode connection of the transmitting element of said highest stage and responsive to a change of said latter transmitting element to non-conducting condition, to delay the change of said locking means to releasing condition for somewhat longer than the duration of one impulse.

13. In a counter, a series of trigger stages connected in cascade, each comprising a counting element having an anode, a cathode and a grid, a similar transmitting element, means cross-coupling the plates and grids of said counting and transmitting elements, and an impulsing capacitance connected to each of said grids, a source of operating voltage for said counter and for biasing, means for applying impulses to be counted to the lowest stage capacitance, a locking element comprising an anode, a grid and a cathode connected in parallel with the transmitting element of a lower stage and said grid connected to the anode of the counting element of the highest stage of the series, the voltage relations being such that the potential of the grid of said locking element is above the cutoff point when the counting element of the highest stage is non-conducting and below the cutoff point when said counting element is conducting.

14. In a counter, a series of trigger stages connected in cascade, each comprising a counting element having an anode, a cathode and a grid, a similar transmitting element, means cross-coupling the plate and grids of said counting and transmitting elements, and an impulsing capacitance connected to each of said grids, a source of operating voltage for said counter and for biasing, means for applying impulses to be counted to the lowest stage capacitance, a locking element comprising an anode, a grid, and a cathode, connected in parallel with the transmitting element of a lower stage, and its grid connected to the anode of the counting element of the highest stage of the series, the voltage relations being such that the potential of the grid of said locking element is above the cutoff point when the counting element of the highest stage is non-conducting and below the cutoff point when said counting element is conducting, means connecting the impulsing capacitance of the highest stage in parallel with the impulsing capacitance pertaining to said lower stage, and a delaying connection including a small capacitance connecting said grid of said locking element to the anode of the transmitting element of said highest stage.

15. In a counter, a series of trigger stages connected in cascade, each comprising a counting element having an anode, a cathode and a grid, a similar transmitting element, means cross-coupling the plates and grids of said counting and transmitting elements, and an impulsing capacitance connected to each of said grids, a source of operating voltage for said counter and for biasing means for applying impulses to be counted to the lowest stage capacitance, a locking element comprising an anode, a grid and a cathode, connected in parallel with the transmitting element of a lower stage, and its grid connected to the anode of the counting element of the highest stage of the series, the voltage relations being such that the potential of the grid of said locking element is above the cutoff point when the counting element of the highest stage is non-conducting and below the cutoff point when said counting element is conducting, means connecting the impulsing capacitance of the highest stage in parallel with the impulsing capacitance of said lower stage, a delaying connection including a small capacitance, connecting the grid of said locking element to the anode of the transmitting element of said highest stage, the connections of said last mentioned grid to said transmitting and counting elements including a grid current controlling resistance.

16. In a counter, a group of four stages, each stage comprising a trigger circuit having an ON and an OFF condition and being adapted to be changed from one condition to the other, in alternation, in response to successive electrical impulses, means interconnecting said stages in a series and including means whereby each stage, except the highest in the series, when changing from a chosen condition to another condition transmits an operating impulse to the next stage in the series, said connections also including means to transmit an operating impulse from the lowest stage to the highest stage to trigger the latter in one direction, means to apply operating impulses to the lowest stage of the series, and means controlled by said highest stage to prevent the second stage from responding to every first pulse transmitted from the first stage.

17. A counter comprising a series of trigger elements connected in cascade whereby said triggers would operate in one sequence for each full cycle of operation of said counter under control of pulses applied to one of said triggers and means continuously preventing operation in said first one sequence and producing operation in accordance with a different sequence, said means comprising a circuit connecting one of said elements to another of said elements and initially energized prior to completion of one full counter cycle of operation.

18. A counter comprising a series of trigger elements connected in cascade whereby said triggers would operate in a binary sequence of operation for each full cycle of operation of said counter under control of pulses applied to one of said triggers and means continuously preventing such binary operation for every full cycle of operation of said counter including the first full cycle and for producing operation in accordance with a different sequence said means comprising circuit means interconnecting certain of said elements for cycle within each full counter cycle, operation.

19. A device comprising a plurality of trigger elements, means for connecting said elements whereby they would operate in one sequence of operation under control of pulses applied to one of said elements and means for preventing even one such sequence of operation and producing a different chosen sequence of operation said means comprising a circuit, interconnecting certain of said elements and including time delay means, whereby said interconnecting circuit initiates its operation prior to completion of one full cycle of operation of said counter and terminates its operation upon completion of one such full cycle.

20. An impulse counter comprising a series of trigger elements each operable from one condition of stability to another condition, means interconnecting said elements, means applying pulses to one of said elements whereby said elements would be operated in straight cascade upon said application of pulses, and means for continuously altering said straight cascade operation for every full counter cycle including the first said means comprising a circuit, interconnecting certain of said elements, whereby operation of one of said elements by an impulse applied thereto produces an impulse which is fed directly from said operated element to its interconnected element for altering the operation of said interconnected element within said straight cascade operation.

21. A device including a plurality of trigger units respectively, contiguously connected in ascending series for initiating one sequence of operation under control of pulses applied to one of said units and means altering each of said sequence operations of said units comprising a circuit interconnecting units of said ascending series, and means initiating operation of said interconnecting circuit prior to completion of one full sequence of operation of said device whereby completion of each initiated sequence of operation is repeatedly interrupted.

22. A counter including a plurality of electric discharge trigger elements, means interconnecting contiguous elements in ascending series for initiating straight binary operation under control of pulses applied to one of said elements, and means interconnecting non-contiguous elements for alteration of said straight binary operation, said interconnecting means being initially energized prior to completion of a full cycle of operation of said counter.

23. A device including a plurality of trigger elements connected in ascending series for initiating one cycle of operation under control of pulses applied to one of said elements, and means altering said cycle of operation of said elements comprising a circuit interconnecting a lower element of said ascending series to a non-contiguous higher element and operative to feed an electrical effect only from said lower to said higher element.

24. A device including a plurality of trigger elements connected in ascending series for initiating one cycle of operation under control of pulses applied to one of said elements, and means altering said cyclic operation of said elements comprising a circuit interconnecting a lower element of said ascending series to a non-contiguous higher element, and a feed back circuit interconnecting a higher element and a lower element.

25. A counter comprising electric discharge trigger elements, means interconnecting contiguous elements whereby straight binary operation of said elements in an ascending series is initiated under control of pulses applied to one of said elements, and means for converting said straight binary operation to a different operation comprising a plurality of feed back means interconnecting certain of said triggers and operative within the cycle of said different operation.

26. A counter including a plurality of discharge trigger elements, means interconnecting contiguous elements whereby straight binary operation of said elements is initiated under control of pulses applied to one of said elements, an output circuit for said counter, and means for producing an output for each full cycle of operation of said counter including the first such full cycle and including means interconnecting certain of said elements of said counter and operable within a cycle of operation to alter the initiated binary operation to produce an output effect only after said interconnecting means are rendered effective.

27. In an electrical circuit responsive to successive impulses, a plurality of trigger circuits each having two conditions of stability disposed in cascaded relationship, a first circuit means for applying the impulses to the first trigger circuit, a second circuit means interconnecting two of the trigger circuits and disposed to cause triggering of one of the circuits which would otherwise not normally occur as a result of the cascaded relationship, a third circuit means interconnecting the last-named trigger circuit and another of the trigger circuits disposed to prevent triggering of the other trigger circuit which would otherwise normally occur by reason of the cascaded relationship.

28. In a counter, a group of stages, each comprising a trigger circuit having two stable conditions between which it alternates in response to electrical impulses, means interconnectng said stages in a series for normal operation in the binary base notation and including means whereby each stage except the highest in the series, on changing to one of its stable conditions transmits an operating impulse to the next higher stage in the series, means to apply operating impulses to the lowest stage in the series, and means including a circuit interconnecting a higher stage of the series and a non-contiguous lower stage for preventing, only upon occurrence of a change from one chosen stable condition, the normal binary operation of said lower stage and permitting the normal binary operation during the other stable condition to thereby convert operation from the normal binary to another base notation.

29. A counter comprising a plurality of electronic discharge trigger elements, a source of pulses applied to the first of said trigger elements, means connecting contiguous elements whereby straight binary operation of said elements is initiated, and means for converting said straight binary operation to non-binary operation comprising a plurality of circuits interconnecting respective pairs of triggers all triggers of said pairs comprising non-contiguous triggers.

30. A counter comprising a plurality of trigger elements, a source of pulses applied to the first of said trigger elements, means connecting contiguous elements whereby straight binary operation of said elements is initiated and additional means for converting said straight binary operation to duo-decimal operation comprising a plurality of circuits interconnecting respective pairs of triggers, one of said circuits connecting contiguous triggers.

31. A device as in claim 30, said plurality of circuits also including a circuit interconnecting the second of said series of trigger elements and a non-contiguous succeeding element.

32. A device as in claim 30, said plurality of circuits also including a circuit interconnecting the second of said series of trigger elements and the last of said series.

33. A device as in claim 30, said plurality of circuits comprising one circuit interconnecting the second of said series of trigger elements and the last of said series and another circuit interconnecting the last trigger element and its contiguous trigger element.

34. A counter comprising a plurality of trigger elements, a source of pulses applied to the first of said trigger elements, means connecting contiguous elements whereby straight binary operation of said elements is initiated, and means for converting said straight binary operation to duodecimal operation comprising a blocking element interconnecting the last element and its contiguous element.

35. A device as in claim 34, and including a circuit interconnecting the second trigger element and the last trigger element.

36. A counter comprising a plurality of four trigger elements, a source of pulses applied to the first of said trigger elements whereby straight binary operation of said elements is initiated and means for converting said straight binary operation to duo-decimal operation comprising a blocking element connection between the third trigger element and the fourth trigger element.

37. A device as in claim 36, and including a circuit interconnecting the second trigger element and the fourth trigger element.

BYRON E. PHELPS.

REFERENCES CITED

The following references are of record in the file of this patent:

UNITED STATES PATENTS

| Number | Name | Date |
|---|---|---|
| 2,272,070 | Reeves | Feb. 3, 1942 |
| 2,407,320 | Miller | Sept. 10, 1946 |
| 2,410,156 | Flory | Oct. 29, 1946 |

OTHER REFERENCES

Review of Scientific Instruments, vol. 10, June 1939, "Switching Action of the Eccles-Jordan Trigger Circuit," by Toomin, pgs. 191 and 192. (Copy in Scientific Library.)

Physical Review, vol. 57, 1940, "New Vacuum Tube Scaling—Scaling Ratio," by Lifschutz, pgs. 243 and 244. (Copy in Scientific Library.)

Electronics, June 1944, "A Four-Tube Counter Decade," by John T. Potter. (Copy in Div. 10.)